United States Patent
Oh et al.

(10) Patent No.: US 8,966,913 B2
(45) Date of Patent: Mar. 3, 2015

(54) AUXILIARY AIR CONDITIONER FOR VEHICLE

(75) Inventors: Man Ju Oh, Ulsan (KR); Tae Soo Sung, Asan-si (KR)

(73) Assignees: Hyundai Motor Company, Seoul (KR); Kia Motors Corporation, Seoul (KR); KB Autotech Co., Ltd., Asan-Si (KR)

( * ) Notice: Subject to any disclaimer, the term of this patent is extended or adjusted under 35 U.S.C. 154(b) by 128 days.

(21) Appl. No.: 13/111,502

(22) Filed: May 19, 2011

(65) Prior Publication Data

US 2012/0079835 A1  Apr. 5, 2012

(30) Foreign Application Priority Data

Oct. 4, 2010  (KR) ........................ 10-2010-0096464

(51) Int. Cl.
- *F25B 21/02* (2006.01)
- *F25D 17/04* (2006.01)
- *B60H 1/00* (2006.01)
- *F24F 5/00* (2006.01)

(52) U.S. Cl.
CPC ........ *B60H 1/00428* (2013.01); *B60H 1/00478* (2013.01); *F24F 5/0042* (2013.01); *F24F 2005/0067* (2013.01); *Y02T 10/88* (2013.01)
USPC ............................................. 62/3.61; 62/187

(58) Field of Classification Search
CPC ........... B60H 1/00057; B60H 1/00385; B60H 1/004; B60H 1/11478; F25B 21/02
USPC .............................. 62/3.2, 3.61, 187, 243, 244
See application file for complete search history.

(56) References Cited

U.S. PATENT DOCUMENTS

| 4,232,211 | A | * | 11/1980 | Hill ................................ 219/202 |
| 5,299,631 | A | * | 4/1994 | Dauvergne .................... 165/204 |
| 5,309,731 | A | * | 5/1994 | Nonoyama et al. ............. 62/244 |
| 5,582,234 | A | * | 12/1996 | Samukawa et al. ........... 165/204 |
| 6,213,198 | B1 | * | 4/2001 | Shikata et al. ................. 165/202 |
| 6,604,576 | B2 | * | 8/2003 | Noda et al. .................... 165/202 |
| 6,662,572 | B1 | * | 12/2003 | Howard ......................... 62/3.61 |
| 2002/0026797 | A1 | * | 3/2002 | Sundhar .......................... 62/3.2 |

(Continued)

FOREIGN PATENT DOCUMENTS

| JP | 9-254630 A | 9/1997 |
| JP | 2000-16054 A | 1/2000 |

(Continued)

*Primary Examiner* — Mohammad M Ali
*Assistant Examiner* — Christopher R Zerphey
(74) *Attorney, Agent, or Firm* — Morgan, Lewis & Bockius LLP

(57) ABSTRACT

An auxiliary air conditioning apparatus may include a blower unit, wherein a blower may be provided therein to forcibly blow intake air, a temperature control unit fluid-connected to the blower unit to receive air blown from the blower unit, wherein the temperature control unit includes an evaporator and a heater therein and may be connected to an air duct to exhaust air that may be cooled by the evaporator or heated by the heater, an auxiliary temperature control unit fluid-connected to the blower unit to receive air blown from the blower unit and fluid-connected to the air duct, wherein the auxiliary temperature control unit includes a heat exchanger core provided therein, the heat exchanger core having a thermoelectric device, an auxiliary power supply supplying electrical power to the blower and the heat exchanger core, and an auxiliary cooling/heating control unit controlling operation of the blower and the heat exchanger unit.

10 Claims, 5 Drawing Sheets

(56) References Cited

U.S. PATENT DOCUMENTS

| | | | |
|---|---|---|---|
| 2002/0104324 A1* | 8/2002 | Homan et al. | 62/176.2 |
| 2005/0178128 A1* | 8/2005 | Harwood et al. | 62/3.61 |
| 2006/0080986 A1* | 4/2006 | Inoue | 62/259.2 |
| 2007/0000255 A1* | 1/2007 | Elliot et al. | 62/3.5 |
| 2009/0000311 A1* | 1/2009 | Kmetz et al. | 62/3.61 |
| 2010/0101239 A1* | 4/2010 | LaGrandeur et al. | 62/3.3 |

FOREIGN PATENT DOCUMENTS

| | | |
|---|---|---|
| JP | 2000-146220 A | 5/2000 |
| KR | 10-0623010 B1 | 9/2006 |
| KR | 10-0737583 B1 | 7/2007 |

* cited by examiner

AUXILIARY AIR CONDITIONER FOR VEHICLE

CROSS REFERENCE TO RELATED APPLICATION

The present application claims priority to Korean Patent Application Number 10-2010-0096464 filed on Oct. 4, 2010 the entire contents of which application are incorporated herein for all purposes by this reference.

BACKGROUND OF THE INVENTION

1. Field of the Invention

The present invention relates to an auxiliary air conditioner for a vehicle, and more particularly, to an auxiliary air conditioner for a vehicle, which has improved cooling/heating performance compared to an air conditioning system that is used in the related art, and which can maintain a cabin of the vehicle in the cooled/heated state using a solar cell or surplus power of a battery when the vehicle is stopped.

2. Description of Related Art

In general, an air conditioner, also known as a Heating, Ventilation, and Air Conditioning (HVAC) system, is installed in a vehicle in order to provide a pleasant environment to a driver and passengers by executing a variety of air-conditioning functions, such as ventilation, cooling, and heating, in a cabin in response to driver's operation. Such an HVAC system can be operated by the driver or the passenger using controls, which are provided to the lower right of a steering wheel. The HVAC system can also be operated by adjusting a ventilation passage or running an air conditioner compressor by operating an automatic temperature control unit.

FIG. 1 is a status view schematically showing an air conditioner for a vehicle having a structure of a related art. In the air conditioner for a vehicle of the related art shown in the figure, a ventilation passage of air that passes through an air conditioner evaporator is described as follows: An air inlet door 100 determines whether inside air or outside air will be the source of air to be blown. A blower 101 is configured to forcibly blow the air into a cabin of the vehicle through the air inlet door 100. The air conditioner evaporator 106 is provided such that the air that is introduced from the blower 101 passes through it. An air mix door 103 is configured such that it regulates the amount of the air that is blown toward a heater core 102. Air ducts 104 and air vents 105 are configured to supply the air that has passed through the air conditioner evaporator 106 and the heater core 102 to individual regions of the vehicle.

Describing in greater detail the flow of the air that is supplied into the cabin of the vehicle through the ventilation passage as above, the blower 101 takes in the air from the source of air, which is selected by the air inlet door 100, and forcibly blows the air, so that the blown air is cooled while passing through the evaporator 106 of the air conditioner before being introduced into the cabin of the vehicle.

After having passed through the evaporator 106 of the air conditioner, the air is introduced into the cabin of the vehicle through the air ducts 104 and the air vents 105, after selectively having passed through the heater core 102 depending on the state of the air mix door 103. The air, which has passed through the heater core 102, and the air, which has not passed through the heater core 102, are mixed in a mix zone 107 so that the mixed air is converted to a predetermined temperature. Afterwards, the resultant air is introduced into the cabin of the vehicle through the air ducts 104 and the air vents 105.

Therefore, when the amount of the air that passes through the heater core 102 increases, the temperature of the air supplied into the cabin of the vehicle rises correspondingly. As described above, the air mix door 103 substantially serves to control the temperature of the air that is introduced into the cabin of the vehicle.

Of course, it is possible to supply air having a predetermined temperature into the cabin of the vehicle or regulate the supply of the air by controlling the degree to which the air vents are opened/closed and the degree to which the air conditioner compressor is operated while regulating the basic passageways of the air. The air vents 105 are generally configured to blow the air in three directions, that is, toward the feet, the chest, and the head of the driver or the passenger.

The air conditioner for a vehicle of the related art, which is configured to control the temperature of the cabin of the vehicle, actuates a cooler or a heater to cool or heat the cabin of the vehicle when controls, which are provided on a portion of a dashboard that is to the lower right of a steering wheel, are operated.

In such a combined air conditioner for a vehicle, engine coolant of the heater for a vehicle is heated, and the air taken in by the blower 101 obtains heat necessary for heating while passing through the heater core 102, which is provided in a coolant circulation path.

However, the air conditioner for a vehicle having the above-described structure of the related art stops operating when the vehicle is stopped. This has a problem in that the temperature of the cabin of the vehicle rises when the vehicle is parked outdoors for a long time in the summer. In order to solve this problem, it is necessary to operate the air conditioner by running the engine even when the vehicle is parked. This causes consequent problems of fuel and energy waste.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an auxiliary air conditioner for a vehicle that can perform cooling/heating in a cabin of the vehicle even when the vehicle is stopped.

Also provided is an auxiliary air conditioner for a vehicle that can increase cooling/heating efficiency by performing additional cooling/heating.

In an aspect of the present invention, the auxiliary air conditioning apparatus for a vehicle, may include a blower unit, wherein a blower may be provided therein to forcibly blow intake air, a temperature control unit fluid-connected to the blower unit in order to receive air blown from the blower unit, wherein the temperature control unit may include an evaporator and a heater therein and may be connected to an air duct in order to exhaust air that may be cooled by the evaporator or heated by the heater, an auxiliary temperature control unit fluid-connected to the blower unit to receive air blown from the blower unit and fluid-connected to the air duct, wherein the auxiliary temperature control unit may include a heat exchanger core provided therein, the heat exchanger core having a thermoelectric device, an auxiliary power supply supplying electrical power to the blower and the heat exchanger core, and an auxiliary cooling/heating control unit controlling operation of the blower and the heat exchanger unit.

The auxiliary power supply may supply the electrical power to the blower and the heat exchanger core while the vehicle may have stopped operating, wherein the auxiliary cooling/heating control unit controls the operation of the blower and the heat exchanger unit so that the vehicle may be cooled or heated when a user intends to cool or heat the vehicle while the temperature control unit may have stopped operating.

The blower unit may further include a blower door to selectively open or close an inlet of the temperature control unit or an inlet of the auxiliary temperature control unit.

The auxiliary temperature control unit may include an auxiliary intake duct connected to an inlet of the auxiliary temperature control unit, an auxiliary air duct connected to the auxiliary intake duct and carrying air that may be cooled or heated by the heat exchanger core to the air duct, and an exhaust duct connected to the auxiliary intake duct, wherein the exhaust duct exhausts heat that may be not used in cooling or heating from the heat exchanger core to an outside of the vehicle, wherein the heat exchanger core may be disposed between the auxiliary air duct and the exhaust duct, wherein the heat exchanger core may include heat exchanger fins mounted on a surface of the thermoelectric device, which abuts the auxiliary air duct, heat dissipation fins mounted on the other surface of the thermoelectric device, which abuts the exhaust duct, and a heat-insulating material disposed in a portion in which the thermoelectric device may be mounted.

The heat exchanger core may include a heat pipe, wherein a first end of the heat pipe may be disposed inside the auxiliary air duct and a second end of the heat pipe may be disposed in the exhaust duct in order to transfer heat, wherein heat dissipation fins may be attached to the second end of the heat pipe, at least a thermoelectric device, wherein a surface of the at least a thermoelectric device abuts an outer surface of the first end of the heat pipe, heat exchanger fins abutting the other surface of the at least a thermoelectric device, and a heat-insulating material disposed between the first end of the heat pipe and the heat dissipation fins, thereby surrounding the at least a thermoelectric device.

The auxiliary power supply may be a solar cell, which may be mounted on an outer surface of the vehicle.

The auxiliary power supply may be a battery of the vehicle, and uses surplus power of the battery.

According to exemplary embodiments of the present invention as set forth above, the auxiliary air conditioner for a vehicle has an effect of being able to increase cooling/heating performance by cooling and heating the cabin of the vehicle when an auxiliary air conditioning unit is operated as desired by a user.

In particular, even when the engine is stopped and the vehicle is unoccupied in the summer, the auxiliary temperature control unit can be operated to perform cooling/heating of the cabin of the vehicle, thereby improving the satisfaction of the user. In addition, it is possible to save energy by using the solar cell during the hot summer.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
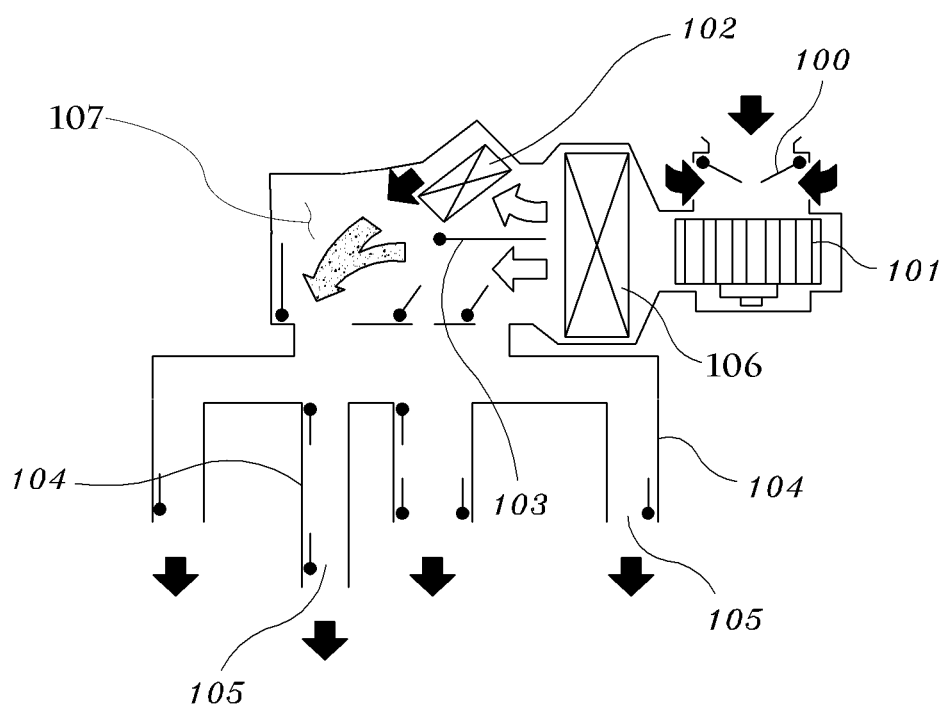
FIG. 1 is a status view schematically showing an air conditioner for a vehicle having a structure of a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Noon Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
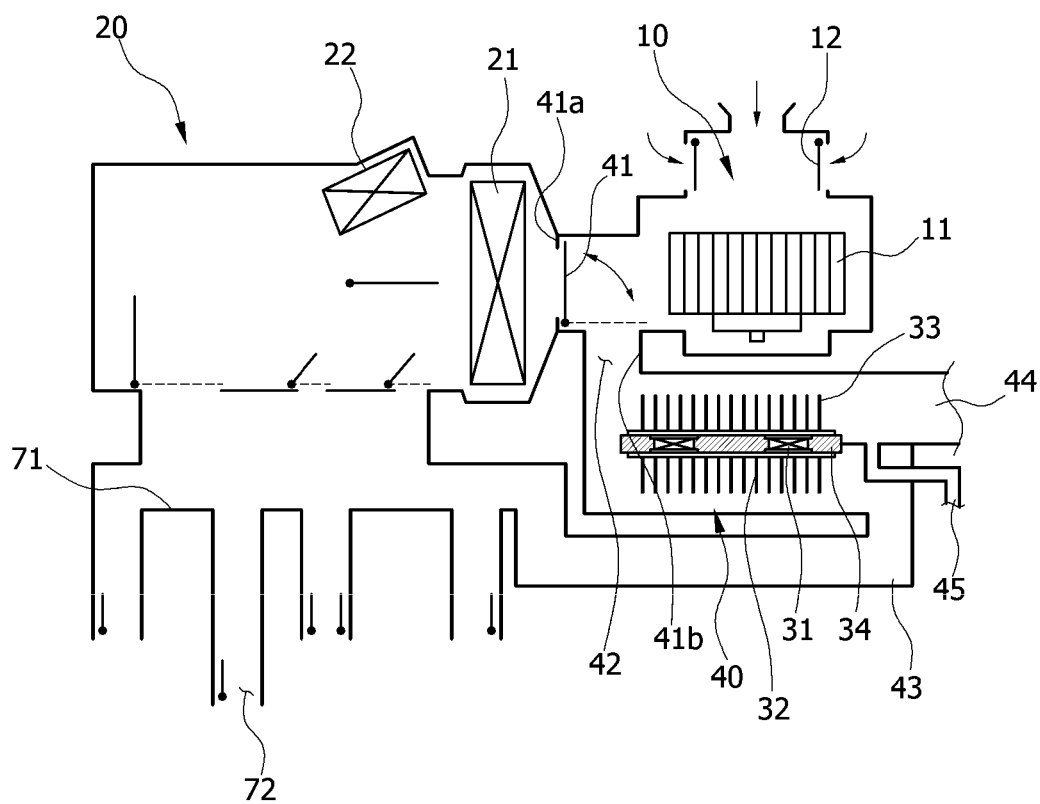
FIG. 2 is a status view schematically showing an auxiliary air conditioner for a vehicle according to various exemplary embodiments of the invention.
Figure 3:
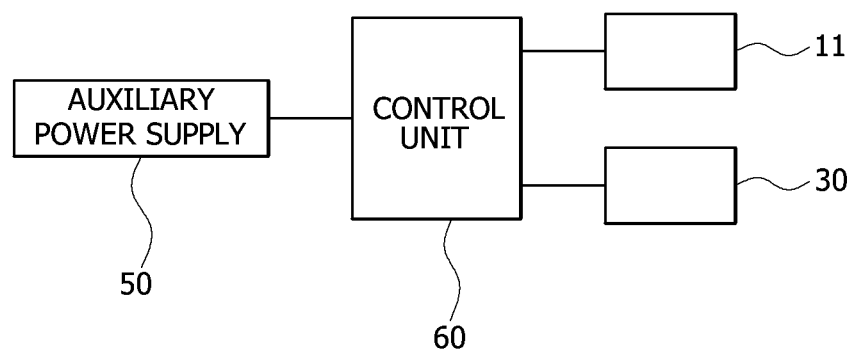
FIG. 3 is a block diagram showing an auxiliary air conditioner for a vehicle shown in FIG. 2.
Figure 4:
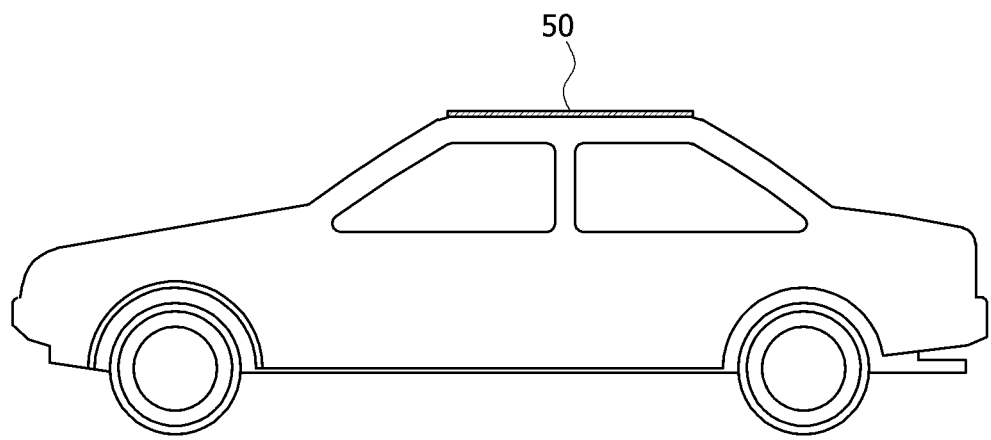
FIG. 4 is a side elevation view showing a solar cell mounting portion.

FIG. 2 is a status view schematically showing an auxiliary air conditioner for a vehicle according to a first exemplary embodiment of the invention, FIG. 3 is a block diagram showing an auxiliary air conditioner for a vehicle shown in FIG. 2, and FIG. 4 is a side elevation view showing a solar cell mounting portion. As shown in the figures, an auxiliary air conditioner for a vehicle includes a blower unit 10, a temperature control unit 20, an auxiliary temperature control unit 40, an auxiliary power supply 50, and an auxiliary cooling/heating control unit 60. The blower unit 10 has an air inlet door 12, which is provided on one portion thereof and determines whether inside air or outside air will be the source of air to be blown. A blower 11 is provided inside the blower unit 10, and can forcibly blow the intake air. The temperature control unit 20 is connected to the blower unit 10 to receive part of the air that is blown from the blower 11, and is provided with an evaporator 21 and a heater 22. The auxiliary temperature control unit 40 is provided with air ducts 71 and air vents 72, which supply the air that has passed through the evaporator 21 and the heater 22 to individual regions of the vehicle. A heat exchange core 30 is also provided in the auxiliary temperature control unit 40. The heat exchange core 30 is fluid-connected to the blower 11 to receive part of the air that is blown from the blower 11, and is provided therein with a thermoelectric device 31. The auxiliary power supply 50 supplies electrical power to the blower 11 and the heat exchanger core 30 even when the vehicle is stopped. The auxiliary cooling/heating control unit 60 controls the blower 11 and the heat exchanger core 30 so that they operate even when the vehicle is stopped.

A blower door 41 is mounted on the portion in which the blower unit 10 diverges into the temperature control unit 20 and the auxiliary temperature control unit 40. The blower door 41 selectively opens/closes an inlet 41a, which leads to the temperature control unit 20, and an inlet 41b, which leads to the auxiliary temperature control unit 40.

The auxiliary temperature control unit 40 includes an auxiliary intake duct 42 connected to the inlet 41b, and an auxiliary air duct 43 diverging from the auxiliary intake duct 42. The auxiliary air duct 43 carries air that has passed through the heat exchanger core 30 toward the air ducts 71. The auxiliary temperature control unit 40 also includes an exhaust duct 44, which diverges from the auxiliary intake duct 42, and exhausts heat that is used in neither cooling nor heating out of the vehicle. A drain line 45, by which moisture that occurs during the operation of the heat exchanger core 30 is discharged from the vehicle, is provided in the exhaust duct 44.

The heat exchanger core 30 includes heat exchanger fins 32, heat dissipation fins 33, and a heat-insulating material 34. The heat exchanger fins 32 are mounted on one surface of a thermoelectric device 31, which abuts the auxiliary air duct 43. The heat dissipation fins 33 are mounted on the other surface of the thermoelectric device 31, which abuts the exhaust duct 44. The heat-insulating material 34 is disposed in the portion in which the thermoelectric device 31 is provided between a group of the heat exchanger fins 32 and a group of the heat dissipation fins 33.

The auxiliary power supply 50 is implemented with a solar cell, which is mounted on the outer surface of the vehicle. The solar cell is mounted, preferably, on the roof of the vehicle, as shown in FIG. 4. However, the solar cell can also be mounted on any portion of the outer surface of the vehicle, which is exposed to sunlight. The auxiliary power supply 50 is not limited to the solar cell, but can be implemented as a battery of the vehicle in order to use surplus power of the battery.

Below, a description is given of a process in which the auxiliary air conditioner for a vehicle according to the first exemplary embodiment of the invention operates.

In the case of intending to cool the cabin of the vehicle when the vehicle is parked and the engine is stopped, the blower door 41 is rotated to close the inlet 41a, which is connected to the temperature control unit 20, and open the inlet 41b, which is connected to the auxiliary intake duct 42. At the same time, the auxiliary cooling/heating control unit 60 controls the auxiliary power supply 50 to supply electrical power to the blower 11 and the heat exchanger core 30.

When the electrical power is supplied to the heat exchanger core 30, the direction of current flowing through the thermoelectric device 31 is controlled so that the heat exchanger fins 32 are converted into a low-temperature state and the heat dissipation fins 33 are converted into a high-temperature state. When the heat exchanger fins 32 are converted into the low-temperature state, part of air that is blown from the blower 11 is cooled while passing through the heat exchanger fins 32. Afterwards, the cooled air is carried to the air duct 71 through the auxiliary air duct 43, and is then output to cabin regions of the vehicle.

In addition, the heat dissipation fins 33 in the high-temperature state is subjected to heat exchange when part of the air that is blown from the blower 11 passes through the heat dissipation fins 33. The heated air is then exhausted from the vehicle through the exhaust duct 44.

Likewise, in the case of intending to heat the cabin of the vehicle, the flow of current through the thermoelectric device 31 is controlled to be opposite to the direction of current in the cooling, so that the heat exchanger fins 32 are converted into a high-temperature state and the heat dissipation fins 33 are converted into a low-temperature state. When the heat exchanger fins 32 are converted into the high-temperature state, part of air that is blown from the blower 11 is heated while passing through the heat exchanger fins 32. Afterwards, the heated air is carried to the air duct 71 through the auxiliary air duct 43, and is then output to cabin regions of the vehicle.

In addition, the heat dissipation fins 33 in the low-temperature state is subjected to heat exchange when part of the air that is blown from the blower 11 is passing through the heat dissipation fins 33. The cooled air is then exhausted from the vehicle through the exhaust duct 44.

In this fashion, the auxiliary air conditioner can be used in the state in which the vehicle is parked and the engine is stopped. It is also possible to enhance heating/cooling performance by additionally operating the auxiliary air conditioner when the temperature control unit 20, i.e. the main air conditioning unit, is operating.

Figure 5:
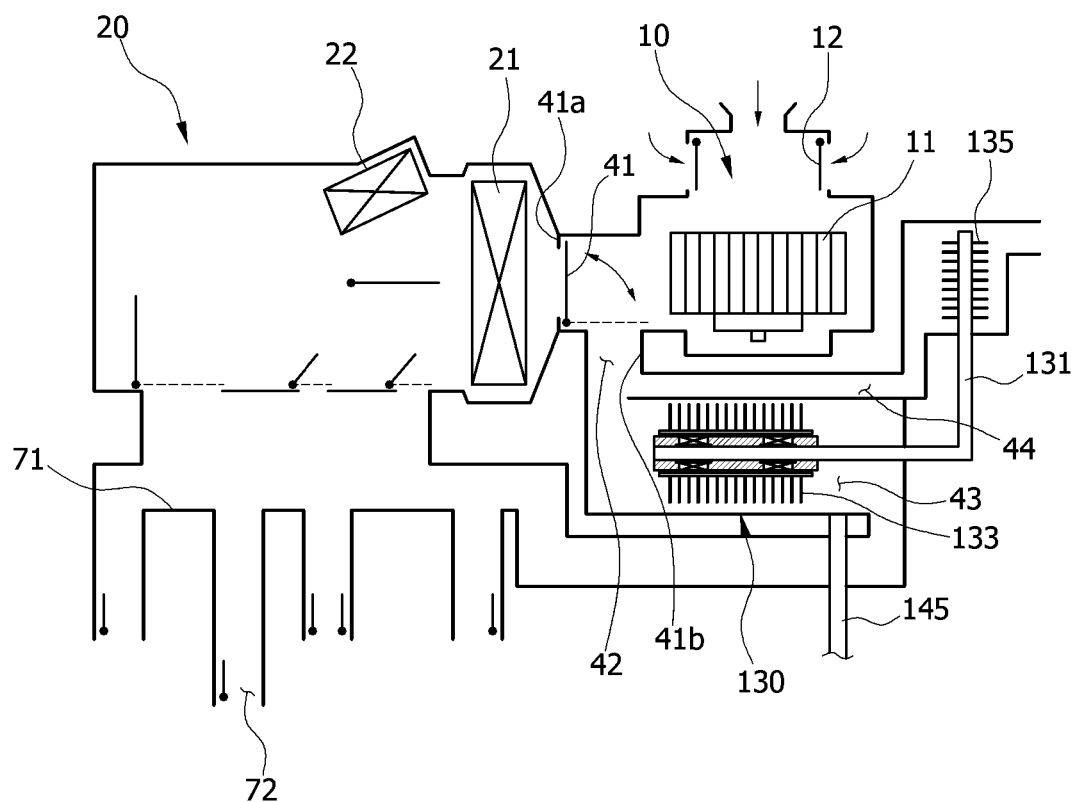
FIG. 5 is a status view showing an auxiliary air conditioner for a vehicle according to various exemplary embodiments of the invention.
Figure 6:
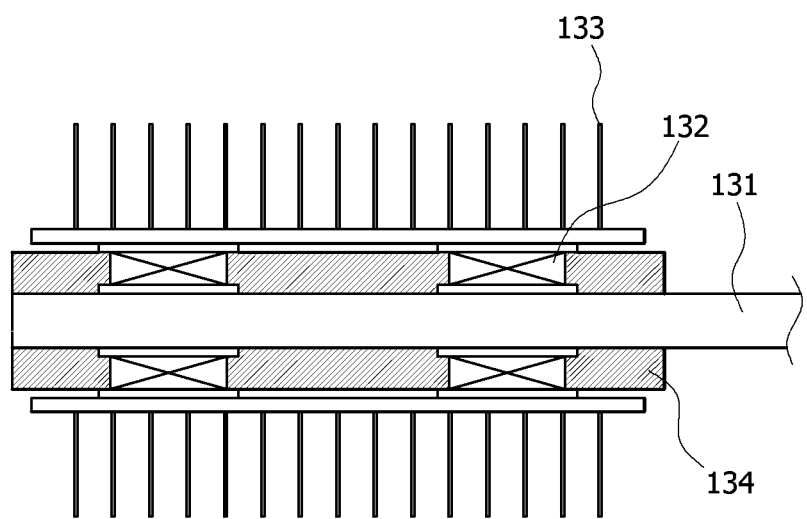
FIG. 6 is a cross-sectional view showing the heat exchange core shown in FIG. 5.

FIGS. 5 and 6 show an auxiliary air conditioner according to a second exemplary embodiment of the invention. As shown in FIGS. 5 and 6, a heat exchanger core 130 includes a heat pipe 131, a plurality of thermoelectric devices 132, and a heat-insulating material 134. One part of the heat pipe 131 is disposed inside the auxiliary air duct 43, the other part of the heat pipe 131 is disposed inside the exhaust duct 44, and a plurality of heat dissipation fins 135 is mounted on the terminal end of the other part of the heat pipe 131. The thermoelectric devices 132 abut the outer surface of one part of the heat pipe 131. The heat exchanger fins 133 abut the outer surface of the thermoelectric devices 132. The heat-insulating material 134 is disposed between the heat pipe 131 and a group of the heat exchanger fins 133 to surround the thermoelectric devices 132.

The heat pipe 131 is a conductor that is mainly used for heat conduction. It is preferred that a plurality of pairs of the heat pipes 131 be used. The heat pipe 131 is generally in the form of a pipe that has a circular cross section.

It is preferred that the heat dissipation fins 135 be positioned higher than the thermoelectric devices 132, which constitute the heat exchanger core 130. If the heat dissipation fins 135 are positioned higher than the thermoelectric devices 132, heat is rapidly transferred toward the heat dissipation fins 135.

The other features of this embodiment are the same as those of the first exemplary embodiment of the invention.

Below, a description is given of a process in which the auxiliary air conditioner for a vehicle according to the second exemplary embodiment of the invention operates.

In the case of intending to cool the cabin of the vehicle when the vehicle is parked and the engine is stopped, the blower door 41 is rotated to close the inlet 41a, which is connected to the temperature control unit 20, and open the inlet 41b, which is connected to the auxiliary intake duct 42. At the same time, the auxiliary cooling/heating control unit 60 controls the auxiliary power supply 50 to supply electrical power to the blower 11 and the heat exchanger core 30.

The direction of current flowing through the thermoelectric devices 132 is controlled so that the outer surface of the thermoelectric devices 132 is converted into a low-temperature state and the inner surface of the thermoelectric devices 132 is converted into a high-temperature state. The outer surface of the thermoelectric devices 132 in the low-temperature state absorbs heat from the heat exchanger fins 133, thereby converting the inner space of the auxiliary air duct 43 into a low-temperature state. In addition, the inner surface of the thermoelectric devices 132 in the high-temperature state transfers heat to one part of the heat pipe 131. The heat transferred to one part of the heat pipe 131 is then transferred up to the heat dissipation fins 135, which are provided on the other part of the heat pipe 131, thereby causing heat exchange inside the exhaust duct 44. The heat exchange occurs when part of air that is blown from the blower 11 through the exhaust duct 44 is passing through the heat dissipation fins 135. The air, which contains the heat transferred form the heat dissipation fins 135, is exhausted from the vehicle through the exhaust duct 44. By repeating the above-described process, heat is dissipated from the heat dissipation fins 135, which are provided on a plurality of the heat pipes 131, thereby improving the cooling performance of the heat exchanger core 130.

In this state, part of the air that is blown from the blower 11 is cooled while passing through the heat exchanger fins 133 of the heat exchanger core 130. Afterwards, the cooled air is carried to the air duct 71 through the auxiliary air duct 43, and is then output to cabin regions of the vehicle.

Likewise, in the case of intending to perform heating using the auxiliary air conditioner, the flow of current through the thermoelectric devices 132 is controlled to be opposite to the direction of current in the cooling, so that the outer surface of the heat exchanger devices 132 is converted into a high-temperature state and the inner surface of the heat exchanger devices 132 is converted into a low-temperature state. The inner surface of the heat exchanger devices 132 in the low-temperature state absorbs heat from one part of the heat pipe 131. This low-temperature state is transferred up to the heat dissipation fins 135, which are provided on the other part of the heat pipe 131, so that heat exchange occurs inside the exhaust duct 44. The heat exchange occurs when part of air that is blown from the blower 11 is passing through the heat dissipation fins 135. The air that is cooled through the heat exchange with the heat dissipation fins 135 is then exhausted from the vehicle through the exhaust duct 44. By repeating the above-described process, the cold air is produced through the heat exchange with the heat dissipation fins 135, which are provided on a plurality of the heat pipes 131, and is exhausted to the outside, thereby improving the heating performance of the heat exchanger core 130.

In that state, part of the air that is blown from the blower 11 passes through the heat exchanger fins 133 of the heat exchanger core 130, thereby being heated. Afterwards, the heated air is carried to the air duct 71 through the auxiliary air duct 43, and is then output to cabin regions of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An auxiliary air conditioning apparatus for a vehicle, comprising:
    a blower unit, wherein a blower is provided therein to forcibly blow intake air;
    a temperature control unit fluid-connected to the blower unit in order to receive air blown from the blower unit, wherein the temperature control unit includes an evaporator and a heater therein and is connected to an air duct in order to exhaust air that is cooled by the evaporator or heated by the heater;
    an auxiliary temperature control unit fluid-connected to the blower unit to receive air blown from the blower unit and fluid-connected to the air duct, wherein the auxiliary temperature control unit includes a heat exchanger core provided therein, the heat exchanger core having a thermoelectric device and is connected to the air duct in order to exhaust air that is cooled or heated by the heat exchanger core;
    an auxiliary power supply supplying electrical power to the blower and the heat exchanger core; and
    an auxiliary cooling/heating control unit controlling operation of the blower and the heat exchanger core;
    wherein the temperature control unit and the auxiliary temperature control unit have separate air inlets and independent air passages from each other, and the blower unit includes a blower door capable of selectively opening the air inlet of the temperature control unit while closing the air inlet of the auxiliary temperature control unit or vice versa;
    wherein the auxiliary cooling/heating control unit is configured to cool or heat a cabin of the vehicle when an engine is stopped, by rotating the blower door to close the air inlet which is connected to the temperature control unit while opening the air inlet which is connected to the auxiliary temperature control unit, and at a same time, the auxiliary cooling/heating control unit controls the auxiliary power supply to supply electrical power to the blower and the heat exchanger core.

2. The auxiliary air conditioning apparatus according to claim 1, wherein the auxiliary power supply is a solar cell, which is mounted on an outer surface of the vehicle.

3. The auxiliary air conditioning apparatus according to claim 1, wherein the auxiliary power supply is a battery of the vehicle, and uses surplus power of the battery.

4. The auxiliary air conditioning apparatus according to claim 1, wherein the auxiliary temperature control unit includes:
    an auxiliary intake duct connected to an inlet of the auxiliary temperature control unit; an auxiliary air duct connected to the auxiliary intake duct and carrying air that is cooled or heated by the heat exchanger core to the air duct; and
    an exhaust duct connected to the auxiliary intake duct, wherein the exhaust duct exhausts heat that is not used in cooling or heating from the heat exchanger core to an outside of the vehicle.

5. The auxiliary air conditioning apparatus according to claim 4, wherein the heat exchanger core is disposed between the auxiliary air duct and the exhaust duct.

6. The auxiliary air conditioning apparatus according to claim 4, wherein the auxiliary power supply is a solar cell, which is mounted on an outer surface of the vehicle.

7. The auxiliary air conditioning apparatus according to claim 4, wherein the auxiliary power supply is a battery of the vehicle, and uses surplus power of the battery.

8. The auxiliary air conditioning apparatus according to claim 5, wherein the heat exchanger core includes:
   heat exchanger fins mounted on a surface of the thermoelectric device, which abuts the auxiliary air duct;
   heat dissipation fins mounted on the other surface of the thermoelectric device, which abuts the exhaust duct; and
   a heat-insulating material disposed in a portion in which the thermoelectric device is mounted.

9. The auxiliary air conditioning apparatus according to claim 8, wherein the auxiliary power supply is a solar cell, which is mounted on an outer surface of the vehicle.

10. The auxiliary air conditioning apparatus according to claim 8, wherein the auxiliary power supply is a battery of the vehicle, and uses surplus power of the battery.

\* \* \* \* \*